United States Patent
Aguirre et al.

(10) Patent No.: US 10,111,050 B2
(45) Date of Patent: Oct. 23, 2018

(54) INTERFERENCE REDUCTION FOR EMBMS SERVICE

(71) Applicant: Verizon Patent and Licensing Inc., Arlington, VA (US)

(72) Inventors: Sergio Aguirre, Southlake, TX (US); Rakesh Chandwani, Freehold, NJ (US); Lalit R. Kotecha, San Ramon, CA (US); Amir Saghir, Monmouth Junction, NJ (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 740 days.

(21) Appl. No.: 14/578,840

(22) Filed: Dec. 22, 2014

(65) Prior Publication Data

US 2016/0182178 A1    Jun. 23, 2016

(51) Int. Cl.
| | | |
|---|---|---|
| H04W 4/06 | (2009.01) | |
| H04W 72/00 | (2009.01) | |
| H04J 11/00 | (2006.01) | |
| H04L 5/00 | (2006.01) | |
| H04W 72/08 | (2009.01) | |

(52) U.S. Cl.
CPC ........... *H04W 4/06* (2013.01); *H04J 11/0053* (2013.01); *H04J 11/0056* (2013.01); *H04L 5/0044* (2013.01); *H04L 5/0062* (2013.01); *H04W 72/005* (2013.01); *H04W 72/082* (2013.01)

(58) Field of Classification Search
CPC ...... H04W 4/06; H04L 5/0044; H04L 5/0062; H04J 11/0056
See application file for complete search history.

(56) References Cited

U.S. PATENT DOCUMENTS

| | | | | |
|---|---|---|---|---|
| 2013/0003640 A1* | 1/2013 | Yang | ................... | H04W 72/005 370/312 |
| 2013/0058234 A1* | 3/2013 | Yang | ..................... | H04L 27/261 370/252 |
| 2014/0247766 A1* | 9/2014 | Zhang | ................. | H04W 72/005 370/312 |
| 2014/0355507 A1* | 12/2014 | Amerga | ................... | H04W 4/08 370/312 |
| 2015/0023275 A1* | 1/2015 | Kim | ...................... | H04L 5/0035 370/329 |
| 2015/0296400 A1* | 10/2015 | Yang | ..................... | H04W 16/32 370/252 |
| 2015/0358940 A1* | 12/2015 | Zhang | ..................... | H04W 4/06 370/312 |
| 2016/0099791 A1* | 4/2016 | Cui | ...................... | H04J 11/0053 370/329 |
| 2016/0135194 A1* | 5/2016 | Kim | ...................... | H04L 1/0038 370/329 |
| 2017/0070865 A1* | 3/2017 | Mazzarese | ............ | H04W 72/04 |

* cited by examiner

*Primary Examiner* — Gary Mui

(57) ABSTRACT

A device may receive information identifying a first sub-frame being transmitted by a base station via a first radio frame. The first sub-frame may be reserved for providing a particular set of transmissions. The device may identify a second sub-frame, that is to be transmitted by the device via a second radio frame and that corresponds to the first sub-frame. The second sub-frame being included in a second radio frame. The device may blank the second sub-frame based on identifying the second sub-frame that corresponds to the first sub-frame. The device may transmit the second radio frame with the blanked second sub-frame.

20 Claims, 13 Drawing Sheets

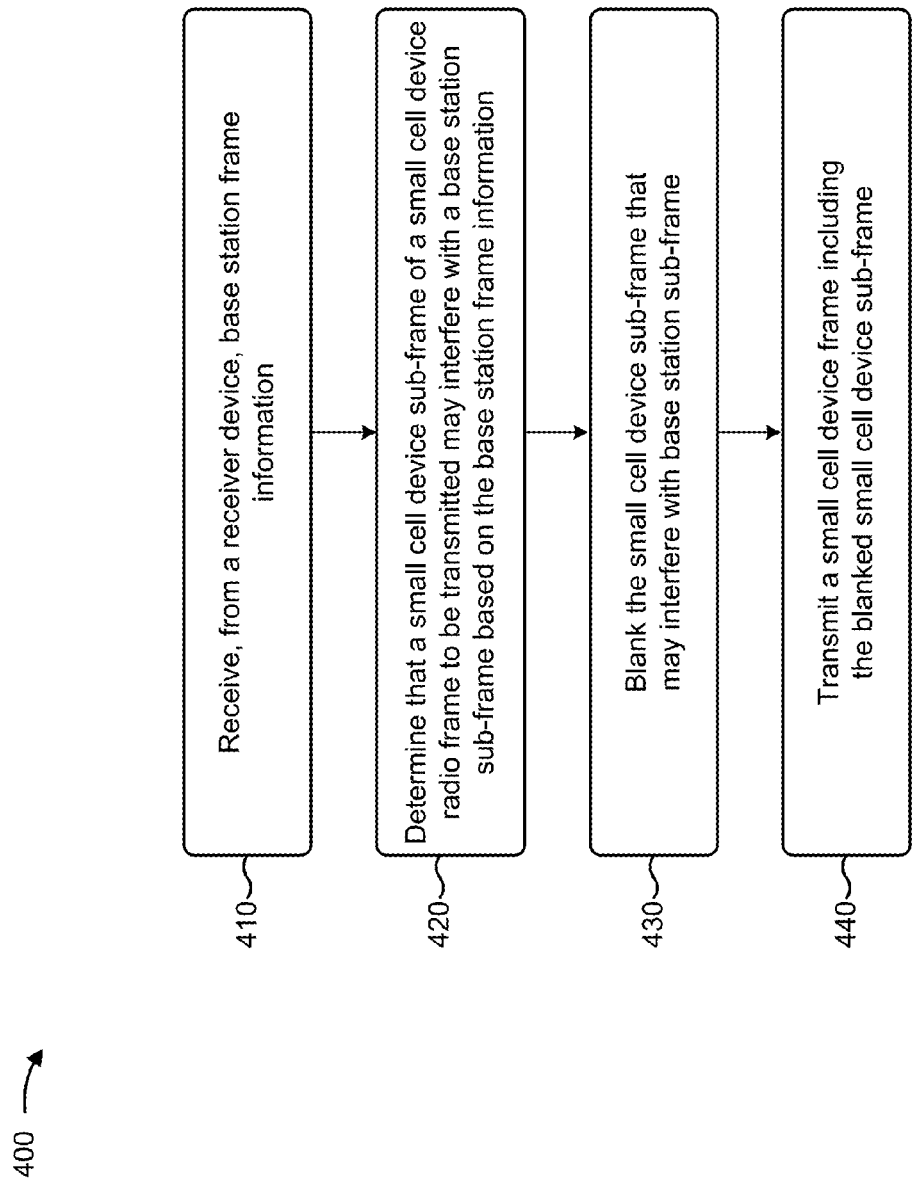

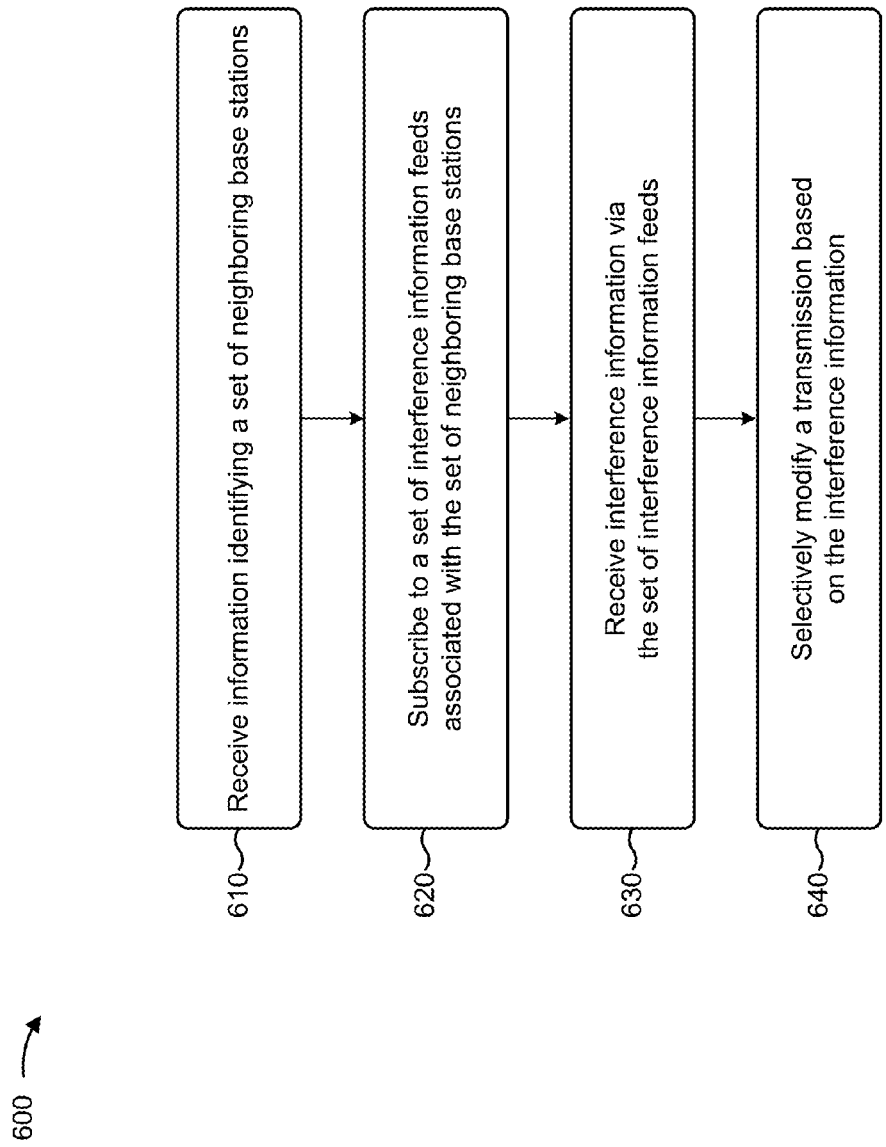

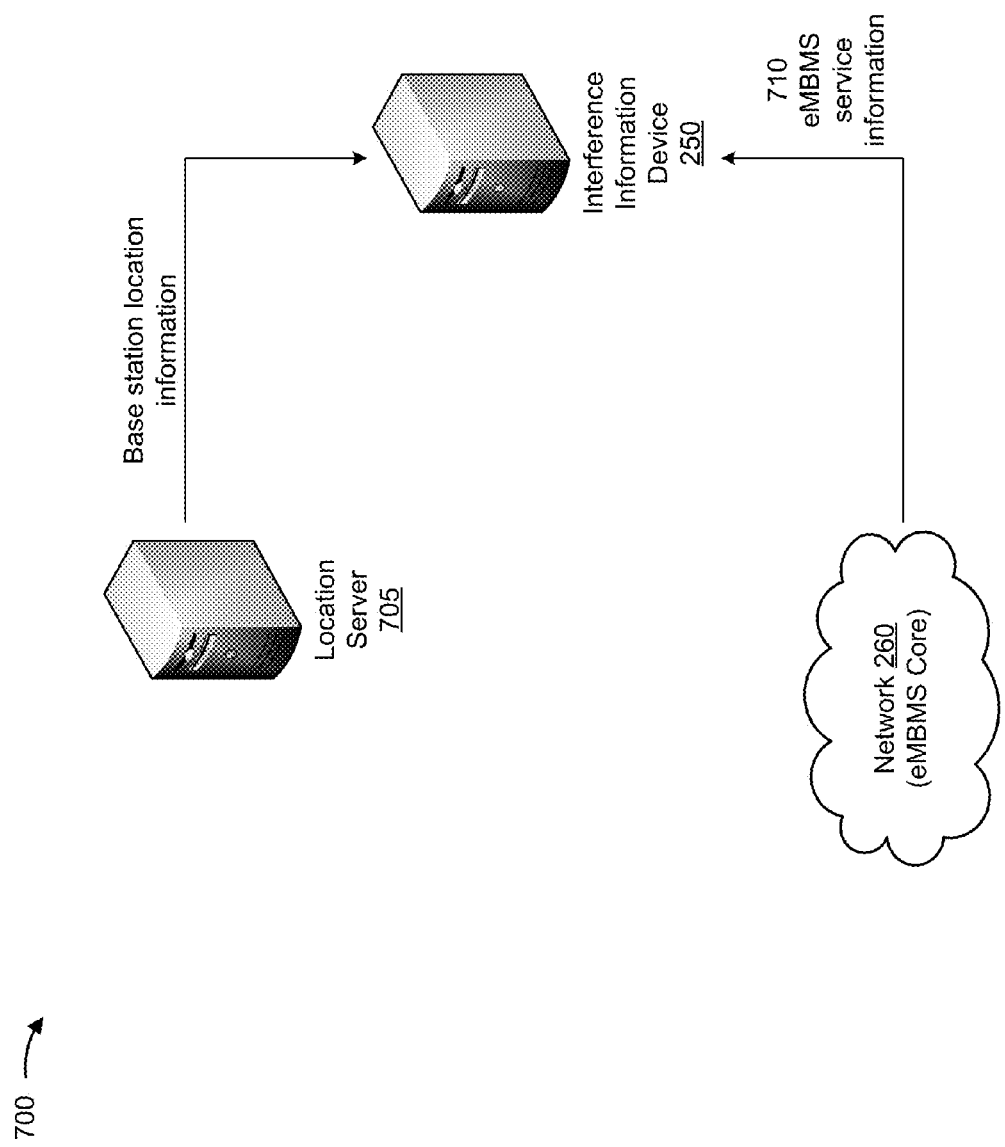

INTERFERENCE REDUCTION FOR EMBMS SERVICE

BACKGROUND

A base station utilizing a cell network, such as a long term evolution (LTE) network, or the like, may transmit information using a radio frame. The base station may divide the radio frame into a particular quantity of sub-frames. The base station may synchronize transmission of radio frames with other base stations within a particular proximity to the base station to avoid interference.

BRIEF DESCRIPTION OF THE DRAWINGS

FIG. 4 is a flow chart of an example process for detecting a base station sub-frame and selectively blanking a corresponding small cell device sub-frame to prevent interference;

FIG. 6 is a flow chart of an example process for modifying a small cell device transmission based on information from an interference information feed to prevent interference; and FIGS. 7A-7D are diagrams of an example implementation relating to the example process shown in FIG. 6.

DETAILED DESCRIPTION OF PREFERRED EMBODIMENTS

The following detailed description of example implementations refers to the accompanying drawings. The same reference numbers in different drawings may identify the same or similar elements.

A base station may transmit information to a user device via a set of radio frames. A radio frame may include a set of sub-frames. The base station may utilize long term evolution (LTE) multimedia broadcast multicast service (eMBMS) to provide efficient delivery of mobile television programming, mobile radio, emergency alerts, or the like. The base station may provide eMBMS via a particular set of pre-allocated, semi-statically reserved sub-frames of a set of sub-frames. The base station may avoid interference with other base stations by synchronizing transmissions. However, small cell devices, such as femtocell base stations (e.g., femtocells), picocell base stations (e.g., picocells), or the like, may lack synchronization information (e.g., due to a different vendor configuration, a lack of information regarding transmissions being provided by the base station, etc.), and may transmit information using the same set of sub-frames that are reserved for an eMBMS transmission by a base station in the same area. Implementations, described herein, may assist a small cell device in determining one or more sub-frames that may interfere with base station eMBMS transmissions, and in selectively blanking the one or more sub-frames to prevent interference with the base station eMBMS transmissions.

Figure 1A:
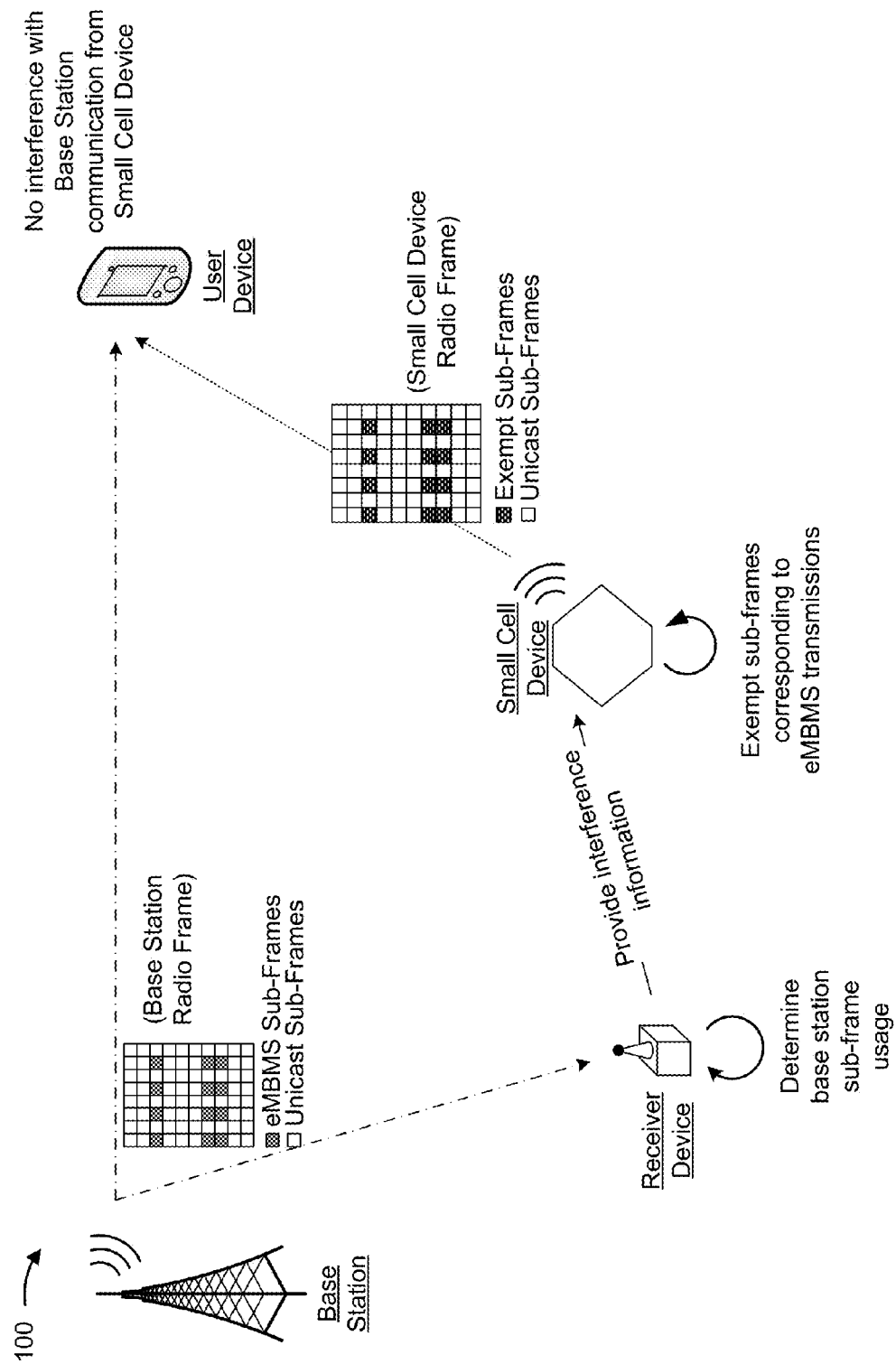
FIGS. 1A and 1B are diagrams of an overview of an example implementation described herein.
Figure 1B:
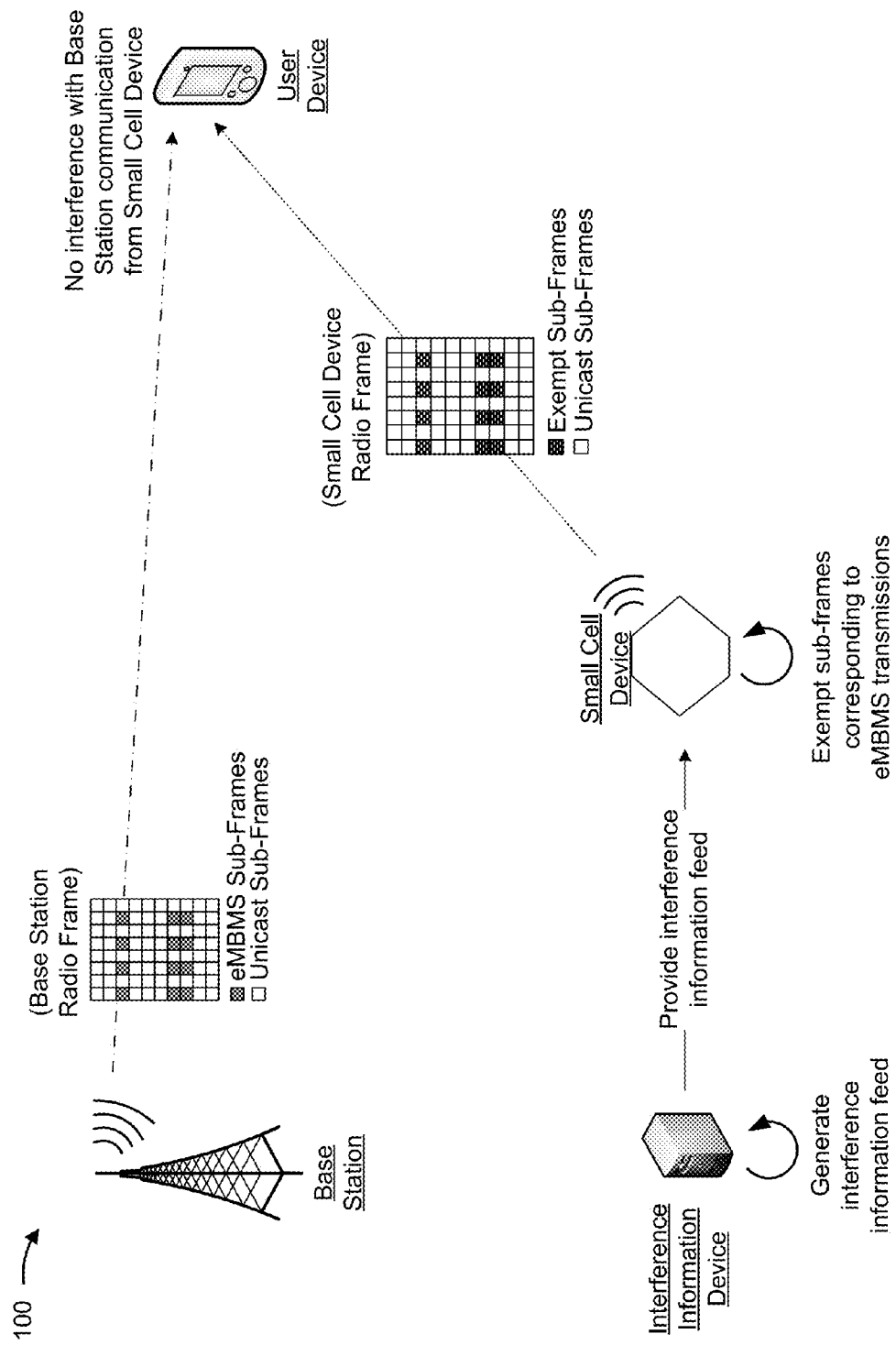

FIGS. 1A and 1B are diagrams of an overview of an example implementation 100 described herein. As shown in FIG. 1A, a base station may communicate with a user device by transmitting a base station radio frame (e.g., a particular radio frame provided by the base station). The base station radio frame may include a first set of base station sub-frames (e.g., a particular set of sub-frames provided by the base station) being utilized for eMBMS transmissions and a second set of base station sub-frames being utilized for unicast transmissions. A receiver device, which is associated with a small cell device (e.g., a femtocell, a picocell, or the like), may receive the base station radio frame, and may identify the first set of base station sub-frames being utilized for eMBMS transmissions.

As further shown in FIG. 1A, the small cell device may receive interference information, from the receiver device, identifying the set of base station sub-frames being utilized for eMBMS transmissions. The small cell device may blank a set of small cell device sub-frames (e.g., a particular set of sub-frames provided by the small cell device) corresponding to the first set of base station sub-frames being utilized for eMBMS transmissions. Blanking a sub-frame may refer to configuring a transmission, that includes the sub-frame, to exempt the sub-frame from information being provided therein and/or to reduce a quantity of information being provided to a threshold level. The small cell device may transmit a small cell device radio frame (e.g., a particular radio frame provided by the small cell device) after blanking the set of small cell device sub-frames. A user device may receive the base station radio frame and the small cell device radio frame without encountering interference for the eMBMS transmissions. In this way, the small cell device may detect eMBMS transmissions, and may selectively blank a set of small cell device sub-frames to prevent interference with the eMBMS transmissions.

As shown in FIG. 1B, an interference information device may generate an interference information feed (e.g., based on communications with the base station). The interference information feed may include a rich site summary (RSS) feed, a Twitter feed, or the like that provides information associated with an eMBMS transmission from the base station, such as frequency information, phase information, scheduling information, eMBMS sub-frame allocation information, or the like. The interference information device may provide the interference information feed to the small cell device. The small cell device may identify a set of base station sub-frames associated with eMBMS transmissions, and may selectively exempt a corresponding set of small cell device sub-frames from use. The small cell device may transmit a set of small cell device radio frames after exempting the set of small cell device sub-frames from use. The user device may receive the set of small cell device radio frames and a set of base station radio frames without encountering interference for eMBMS transmissions. In this way, a small cell device may access an information feed providing interference information, and may exempt a set of small cell device sub-frames from use to avoid interference with eMBMS transmissions provided by a base station.

Figure 2:
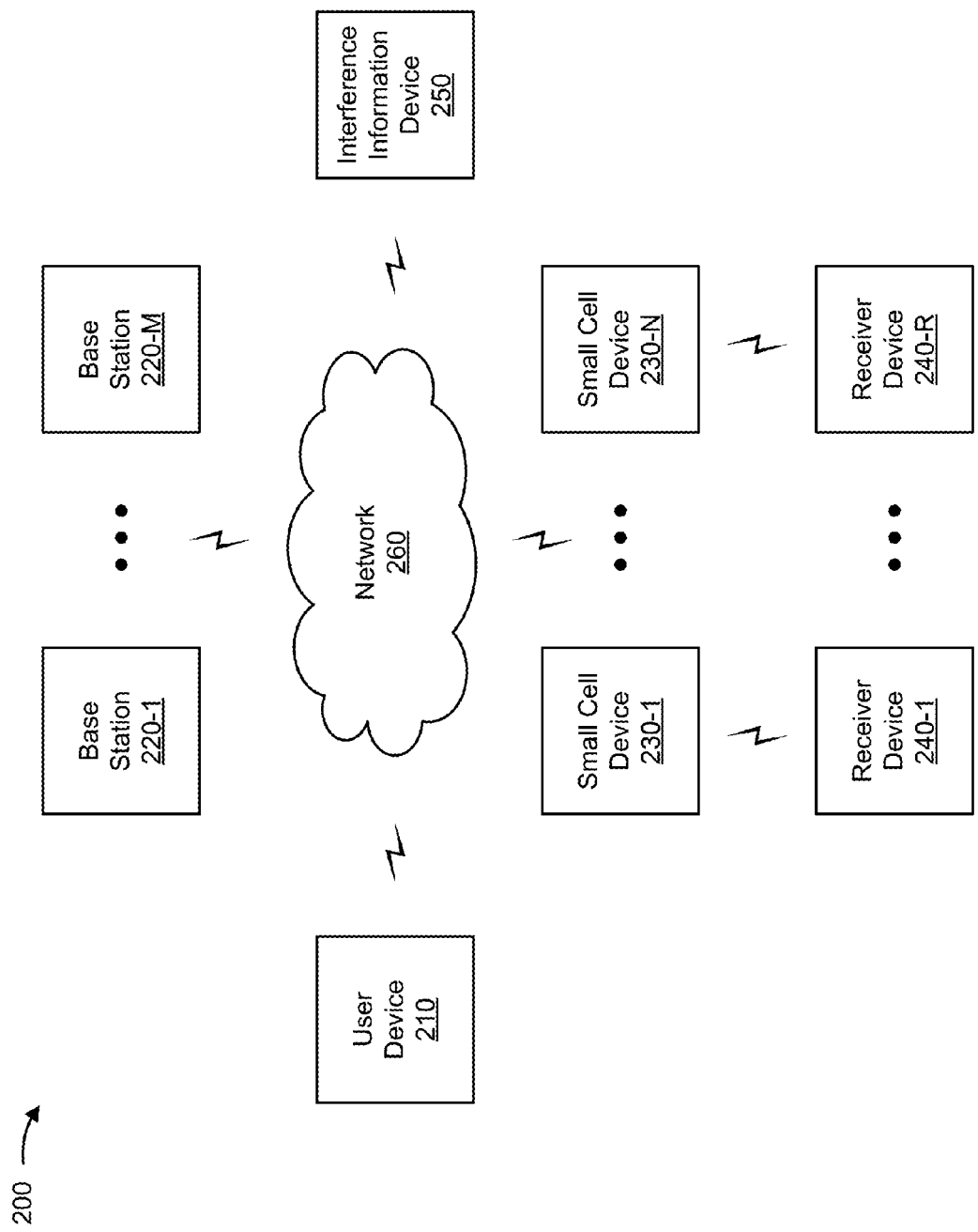
FIG. 2 is a diagram of an example environment in which systems and/or methods, described herein, may be implemented.

FIG. 2 is a diagram of an example environment 200 in which systems and/or methods, described herein, may be implemented. As shown in FIG. 2, environment 200 may include a user device 210, one or more base stations 220-1 through 220-M (M≥1) (hereinafter referred to collectively as "base stations 220," and individually as "base station 220"), one or more small cell devices 230-1 through 230-N(N≥1) (hereinafter referred to collectively as "small cell devices 230," and individually as "small cell device 230"), one or more receiver devices 240-1 through 240-R (R≥1) (hereinafter referred to collectively as "receiver devices 240," and individually as "receiver device 240"), an interference information device 250, and a network 260. Devices of environment 200 may interconnect via wired connections, wireless connections, or a combination of wired and wireless connections.

User device 210 may include a device capable of receiving, generating, storing, processing, and/or providing information associated with communications via network 260. For example, user device 210 may include a communications and/or computing device, such as a mobile phone (e.g., a smart phone, a radiotelephone, etc.), a laptop computer, a tablet computer, a handheld computer, a gaming device, or a similar device. In some implementations, user device 210 may be configured to receive eMBMS transmissions. In some implementations, user device 210 may receive information from and/or transmit information to another device in environment 200.

Base station 220 may include one or more devices capable of transferring traffic, such as audio, video, text, and/or other traffic, destined for and/or received from user device 210. In some implementations, base station 220 may include an eNodeB (eNB) associated with an LTE network that receives traffic from and/or sends traffic to network 260. Additionally, or alternatively, one or more base stations 220 may be associated with a radio access network (RAN) that is not associated with the LTE network. Base station 210 may send traffic to and/or receive traffic from user device 210 via an air interface. In some implementations, base station 220 may be configured to provide eMBMS transmissions via a set of radio frames (e.g., base station radio frames) including a set of sub-frames (e.g., base station sub-frames). In some implementations, base station 210 may include a small cell base station, such as a base station of a microcell, a picocell, and/or a femtocell.

Small cell device 230 may include one or more devices capable of transferring traffic, such as audio, video, text, and/or other traffic, destined for and/or received from user device 210. For example, small cell device 230 may include a base station or an access point of a microcell, a picocell, a femtocell, or the like. In some implementations, small cell device 230 may be associated with an LTE network that receives traffic from and/or sends traffic to network 260. In some implementations, small cell device 230 may include an air interface for connecting to network 260. Additionally, or alternatively, small cell device 230 may include receiver 240, which may facilitate a connection with network 260. In some implementations, small cell device 230 may transmit a set of radio frames (e.g., small cell device radio frames) including a set of sub-frames (e.g., small cell device sub-frames). In some implementations, small cell device 230 may include a base station, such as an eNB, or the like.

Receiver device 240 may include one or more devices capable of receiving, generating, storing, processing, and/or providing information associated with communications via network 260. In some implementations, receiver device 240 may detect a transmission from base station 220 that includes a set of base station sub-frames, and may determine that one or more of the base station sub-frames is associated with providing an eMBMS transmission. In some implementations, receiver device 240 may provide, to small cell device 230, information associated with the transmission received from base station 220. In some implementations, receiver device 240 may be embedded in small cell device 230. In some implementations, receiver device 240 may include a neighboring cell signal receiver (NCSR), or another similar device.

Interference information device 250 may include one or more devices capable of receiving, generating, storing, processing, and/or providing information associated with communications via network 260. For example, interference information device 250 may include a server configured to provide information identifying transmissions from base station 220. In some implementations, interference information device 250 may establish an information feed, such as a rich site summary (RSS) feed, a Twitter feed, or the like, that provides information regarding eMBMS transmissions from base station 220.

Network 260 may include one or more wired and/or wireless networks. For example, network 260 may include a cellular network (e.g., an LTE network, a 3G network, a code division multiple access (CDMA) network, etc.), a public land mobile network (PLMN), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, a cloud computing network, and/or a combination of these or another type of network.

The number and arrangement of devices and networks shown in FIG. 2 are provided as an example. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. For example, while small cell device 230 and receiver device 240 are shown as separate devices, small cell device 230 and receiver device 240 may be implemented in a single device. Additionally, or alternatively, a set of devices (e.g., one or more devices) of environment 200 may perform one or more functions described as being performed by another set of devices of environment 200.

Figure 3:
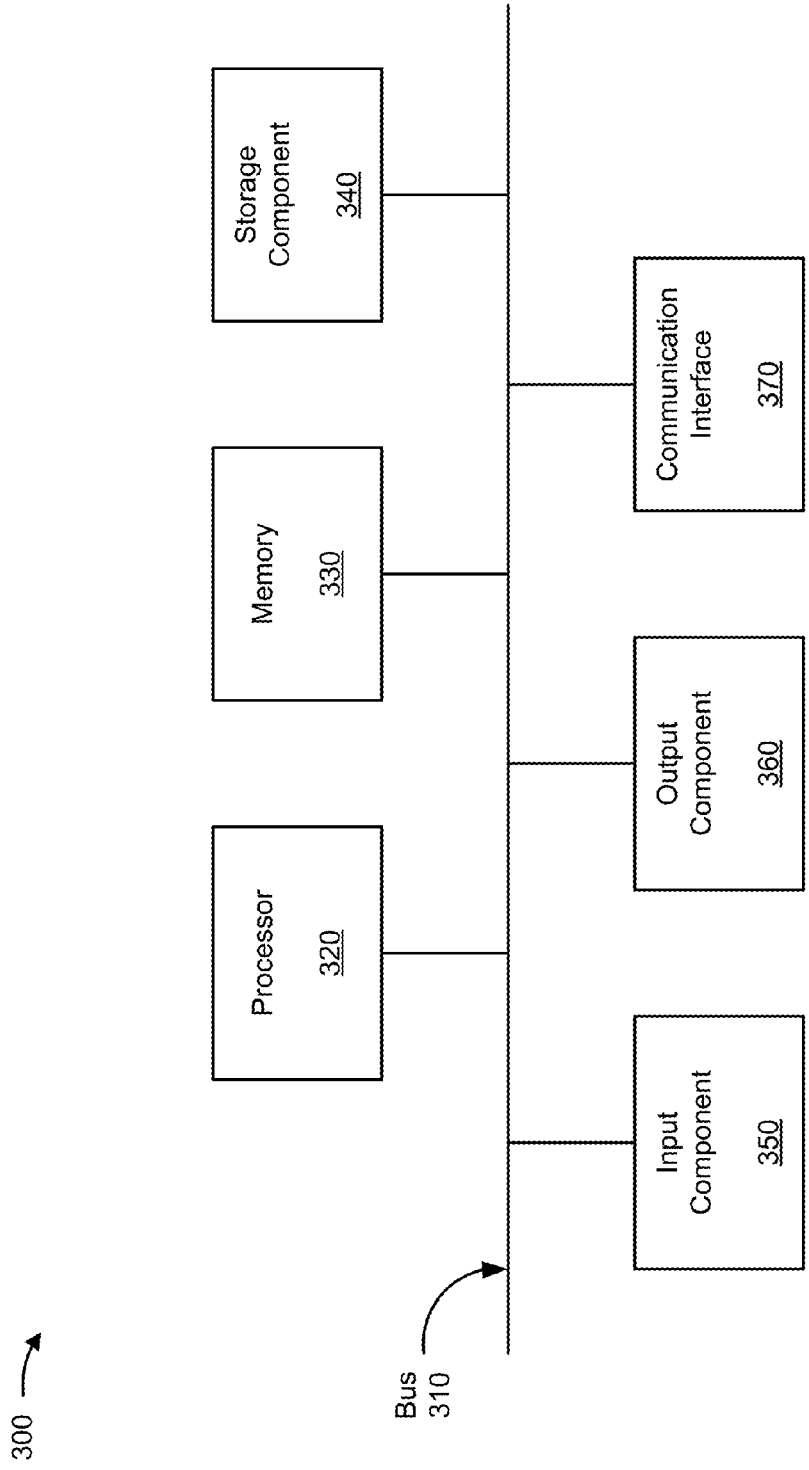
FIG. 3 is a diagram of example components of one or more devices of FIG. 2.

FIG. 3 is a diagram of example components of a device 300. Device 300 may correspond to user device 210, base station 220, small cell device 230, receiver device 240, and/or interference information device 250. In some implementations, user device 210, base station 220, small cell device 230, receiver device 240, and/or interference information device 250 may include one or more devices 300 and/or one or more components of device 300. As shown in FIG. 3, device 300 may include a bus 310, a processor 320, a memory 330, a storage component 340, an input component 350, an output component 360, and a communication interface 370.

Bus 310 may include a component that permits communication among the components of device 300. Processor 320 may include a processor (e.g., a central processing unit (CPU), a graphics processing unit (GPU), an accelerated processing unit (APU), etc.), a microprocessor, and/or any processing component (e.g., a field-programmable gate array (FPGA), an application-specific integrated circuit (ASIC), etc.) that interprets and/or executes instructions. Memory 330 may include a random access memory (RAM), a read only memory (ROM), and/or another type of dynamic or static storage device (e.g., a flash memory, a magnetic memory, an optical memory, etc.) that stores information and/or instructions for use by processor 320.

Storage component 340 may store information and/or software related to the operation and use of device 300. For example, storage component 340 may include a hard disk (e.g., a magnetic disk, an optical disk, a magneto-optic disk, a solid state disk, etc.), a compact disc (CD), a digital versatile disc (DVD), a floppy disk, a cartridge, a magnetic tape, and/or another type of computer-readable medium, along with a corresponding drive.

Input component 350 may include a component that permits device 300 to receive information, such as via user input (e.g., a touch screen display, a keyboard, a keypad, a mouse, a button, a switch, a microphone, etc.). Additionally, or alternatively, input component 350 may include a sensor for sensing information (e.g., a global positioning system (GPS) component, an accelerometer, a gyroscope, an actuator, etc.). Output component 360 may include a component that provides output information from device 300 (e.g., a display, a speaker, one or more light-emitting diodes (LEDs), etc.).

Communication interface 370 may include a transceiver-like component (e.g., a transceiver, a separate receiver and transmitter, etc.) that enables device 300 to communicate with other devices, such as via a wired connection, a wireless connection, or a combination of wired and wireless connections. Communication interface 370 may permit device 300 to receive information from another device and/or provide information to another device. For example, communication interface 370 may include an Ethernet interface, an optical interface, a coaxial interface, an infrared interface, a radio frequency (RF) interface, a universal serial bus (USB) interface, a Wi-Fi interface, a cellular network interface, or the like.

Device 300 may perform one or more processes described herein. Device 300 may perform these processes in response to processor 320 executing software instructions stored by a computer-readable medium, such as memory 330 and/or storage component 340. A computer-readable medium is defined herein as a non-transitory memory device. A memory device includes memory space within a single physical storage device or memory space spread across multiple physical storage devices.

Software instructions may be read into memory 330 and/or storage component 340 from another computer-readable medium or from another device via communication interface 370. When executed, software instructions stored in memory 330 and/or storage component 340 may cause processor 320 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The number and arrangement of components shown in FIG. 3 are provided as an example. In practice, device 300 may include additional components, fewer components, different components, or differently arranged components than those shown in FIG. 3. Additionally, or alternatively, a set of components (e.g., one or more components) of device 300 may perform one or more functions described as being performed by another set of components of device 300.

FIG. 4 is a flow chart of an example process 400 for detecting a base station sub-frame and selectively blanking a corresponding small cell device sub-frame to prevent interference. In some implementations, one or more process blocks of FIG. 4 may be performed by small cell device 230. Additionally, or alternatively, one or more process blocks of FIG. 4 may be performed by another device or a group of devices separate from or including small cell device 230, such as user device 210, base station 220, receiver device 240, and/or interference information device 250.

As shown in FIG. 4, process 400 may include receiving, from a receiver device, base station frame information (block 410). For example, small cell device 230 may receive base station frame information, associated with base station 220, from receiver device 240. Frame information (e.g., base station frame information) may refer to information regarding a set of sub-frames (e.g., a set of base station sub-frames associated with a transmission from base station 220) included in a radio frame (e.g., a base station radio frame associated with a transmission from base station 220). A base station sub-frame may provide information associated with a particular type of transmission, such as information associated with a unicast transmission, a multicast transmission, a broadcast transmission, a multimedia broadcast multicast (MBMS) transmission, an eMBMS transmission, or the like.

In some implementations, small cell device 230 may receive base station frame information identifying the type of transmission for each base station sub-frame of the set of base station sub-frames. For example, receiver device 240 may receive a transmission from base station 220, and may determine that a first set of base station sub-frames of a base station radio frame is associated with providing a unicast transmission and a second set of base station sub-frames is associated with providing an eMBMS transmission or another type of transmission associated with a semi-statically reserved sub-frame. In this case, receiver device 240 may provide base station frame information identifying the first set of base station sub-frames and the second set of base station sub-frames to small cell device 230. Additionally, or alternatively, small cell device 230 may receive, from receiver device 240, base station frame information that includes a representation of a particular base station radio frame, and small cell device 230 may identify a type of transmission for each base station sub-frame based on the representation of the particular base station radio frame.

As further shown in FIG. 4, process 400 may include determining that a small cell device sub-frame of a small cell device radio frame to be transmitted may interfere with a base station sub-frame based on the base station frame information (block 420). For example, small cell device 230 may determine that a particular small cell device sub-frame may cause interference with a particular corresponding base station sub-frame. A small cell device sub-frame may refer to a sub-frame associated with a transmission from small cell device 230 included in a small cell device radio frame (e.g., a particular radio frame being provided by small cell device 230).

In some implementations, small cell device 230 may determine that a particular small cell device sub-frame, to be utilized for a unicast transmission, may interfere with a particular base station sub-frame to be utilized for an eMBMS transmission based on base station frame information identifying a frequency, a phase, or the like for the particular base station sub-frame. For example, small cell device 230 may determine that a signal strength associated with a particular base station radio frame satisfies a threshold, and may determine that interference may occur based on the signal strength satisfying the threshold. In this case, small cell device 230 may blank the particular small cell device sub-frame corresponding to the base station sub-frame.

As further shown in FIG. 4, process 400 may include blanking the small cell device sub-frame that may interfere with the base station sub-frame (block 430). For example, small cell device 230 may blank the small cell device sub-frame that may interfere with the base station sub-frame being utilized to provide an eMBMS transmission. Blanking a sub-frame may refer to configuring a transmission to exempt the sub-frame from providing information and/or reducing the information provided via the sub-frame to satisfy a threshold reduction.

In some implementations, small cell device 230 may abstain from providing information via the particular small cell device sub-frame when blanking the particular small cell device sub-frame. For example, small cell device 230 may provide no information at a particular frequency and at a particular time associated with the particular small cell device sub-frame. Additionally, or alternatively, small cell device 230 may provide an almost blank sub-frame (ABS) at the particular frequency and at the particular time associated with the particular small cell device sub-frame (e.g., a sub-frame that includes control and/or reference information). In some implementations, small cell device 230 may adjust a signal parameter, such as a signal strength parameter, or the like, to blank the particular small cell device sub-frame. For example, small cell device 230 may blank the particular small cell device sub-frame by reducing a signal strength to satisfy a threshold level.

As further shown in FIG. 4, process 400 may include transmitting a small cell device radio frame including the blanked small cell device sub-frame (block 440). For example, small cell device 230 may transmit the small cell device radio frame that includes the blanked small cell device sub-frame to user device 210. In some implementations, small cell device 230 may transmit the small cell device radio frame with a particular signal strength, frequency, phase, or the like for the blanked small cell device sub-frame. Additionally, or alternatively, small cell device 230 may transmit the small cell device radio frame without information being transmitted at a particular frequency, phase, or the like associated with the blanked small cell device sub-frame. In this way, small cell device 230 may provide transmissions in a particular location without causing user device 210 to experience interference in receiving other transmissions from base station 220.

Although FIG. 4 shows example blocks of process 400, in some implementations, process 400 may include additional blocks, fewer blocks, different blocks, or differently arranged blocks than those depicted in FIG. 4. Additionally, or alternatively, two or more of the blocks of process 400 may be performed in parallel.

Figure 5A:
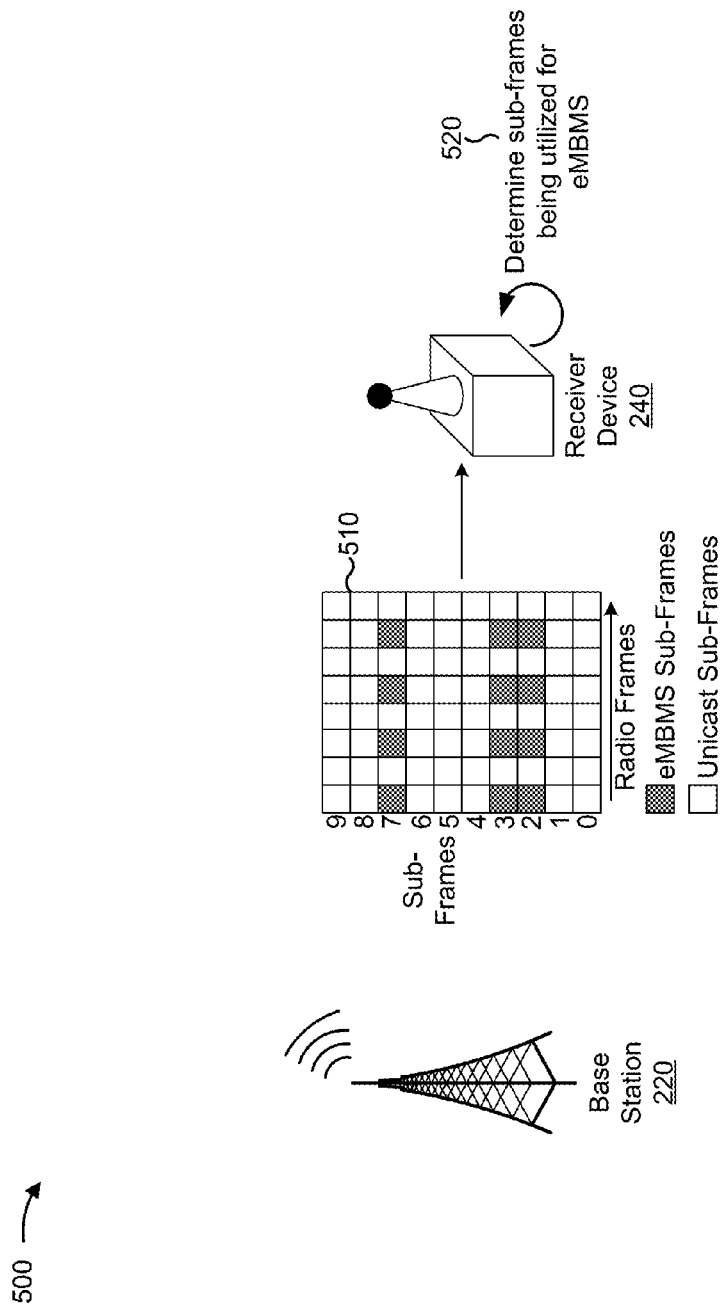
FIGS. 5A-5C are diagrams of an example implementation relating to the example process shown in FIG. 4.
Figure 5B:
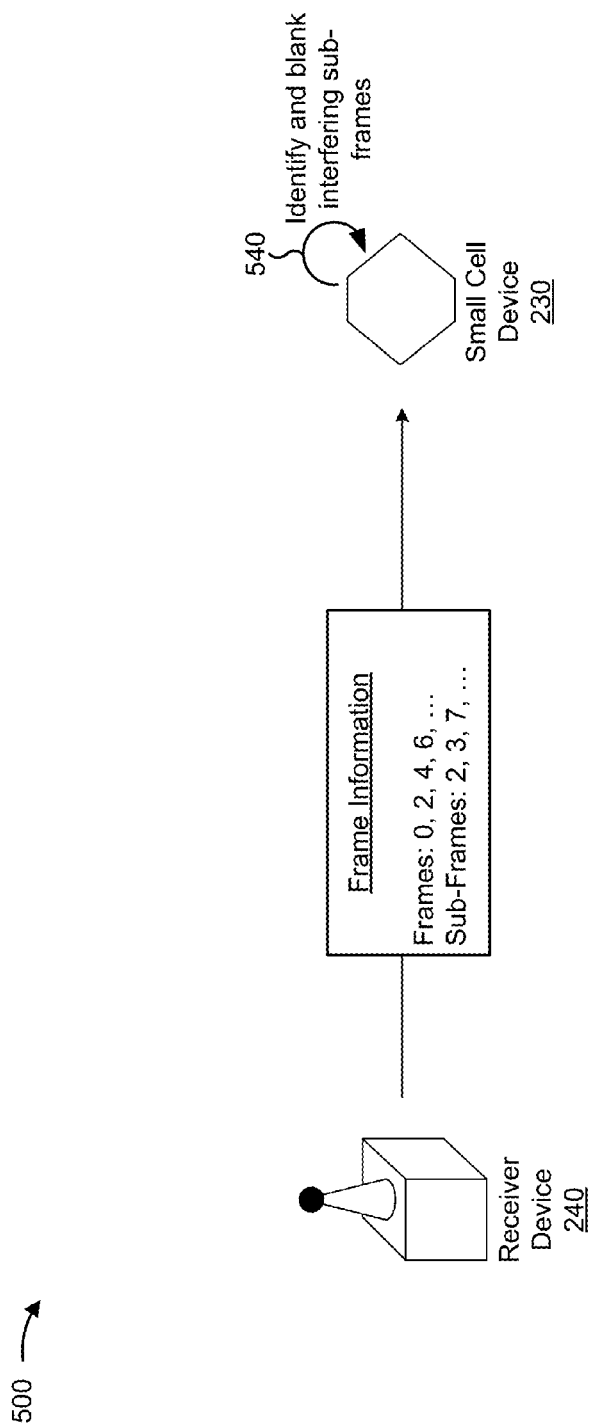
Figure 5C:
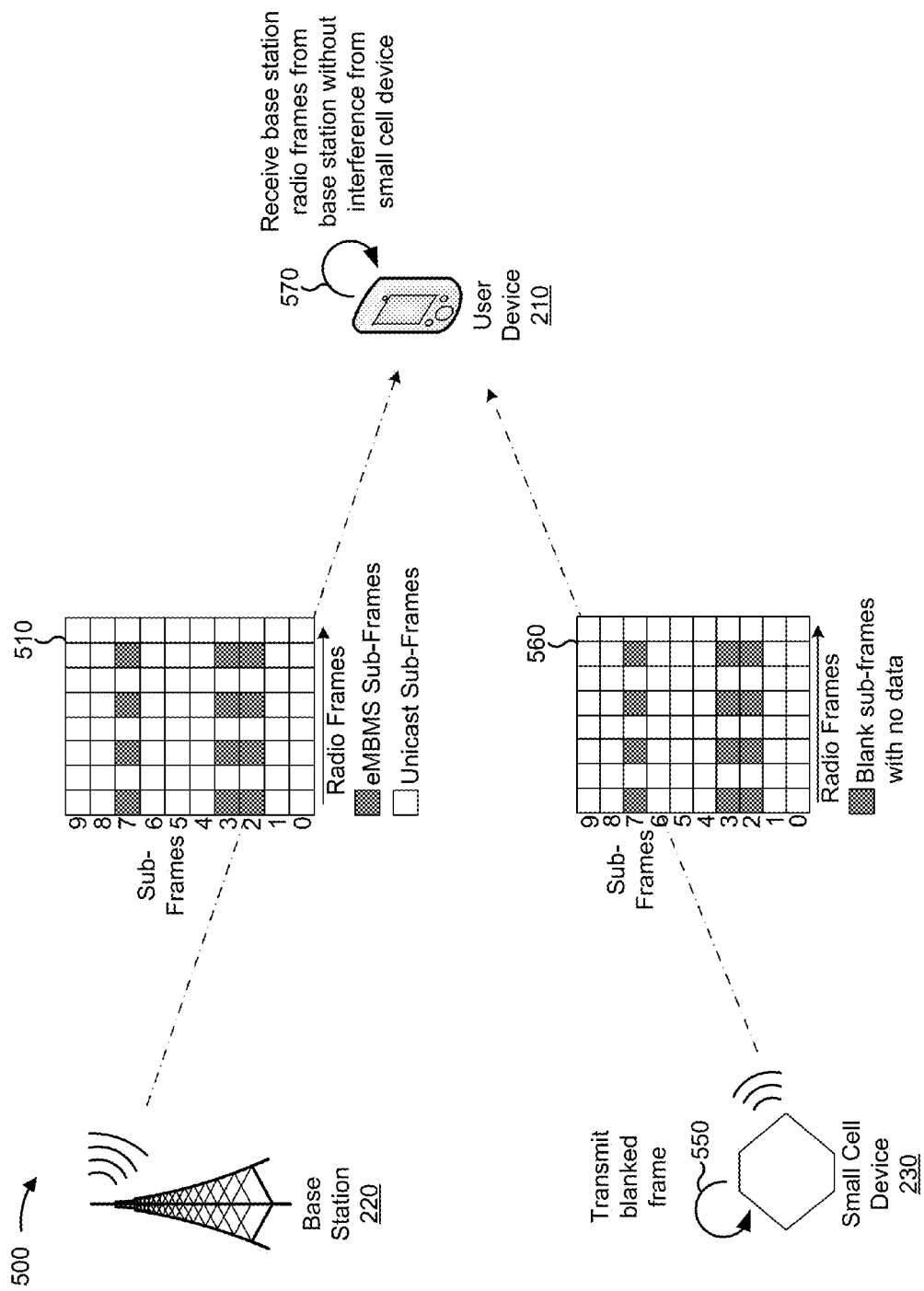

FIGS. 5A-5C are diagrams of an example implementation 500 relating to example process 400 shown in FIG. 4. FIGS. 5A-5C show an example of detecting a base station sub-frame and selectively blanking a corresponding small cell device sub-frame to prevent interference.

As shown in FIG. 5A, base station 220 transmits base station radio frame set 510 (e.g., a particular set of radio frames to be received by user device 210). Base station radio frame set 510 includes a set of base station radio frames (i.e., radio frames) including a set of base station sub-frames (i.e., sub-frames). Assume that the set of base station sub-frames includes a set of eMBMS sub-frames (e.g., sub-frames associated with providing information for an eMBMS transmission) and a set of unicast sub-frames (e.g., sub-frames associated with providing information for a unicast transmission). As shown by reference number 520, receiver device 240 receives base station radio frame set 510 from base station 220, and determines which base station sub-frames are being utilized for providing information associated with eMBMS transmissions.

As shown in FIG. 5B, and by reference number 530, receiver device 240 provides, to small cell device 230, information identifying the eMBMS sub-frames of base station radio frame set 510. As shown by reference number 540, small cell device 230 identifies a particular set of small cell device sub-frames that may interfere with the eMBMS sub-frames, and blanks the particular set of small cell device sub-frames.

As shown in FIG. 5C, base station 220 transmits base station radio frame set 510 to user device 210. As shown by reference number 550, small cell device 230 transmits small cell device radio frame set 560 to user device 210. Small cell device radio frame set 560 includes a first set of small cell device sub-frames being utilized and the particular set of blanked small cell device sub-frames corresponding to the set of eMBMS sub-frames. As shown by reference number 570, user device 210 receives base station radio frame set 510 from base station 220 without interference being caused by small cell device radio frame set 560.

As indicated above, FIGS. 5A-5C are provided merely as an example. Other examples are possible and may differ from what was described with regard to FIGS. 5A-5C.

FIG. 6 is a flow chart of an example process 600 for modifying a small cell device transmission based on information from an interference information feed to prevent interference. In some implementations, one or more process blocks of FIG. 6 may be performed by small cell device 230. In some implementations, one or more process blocks of FIG. 6 may be performed by another device or a group of devices separate from or including small cell device 230, such as user device 210, base station 220, receiver device 240, and/or interference information device 250.

As shown in FIG. 6, process 600 may include receiving information identifying a set of neighboring base stations (block 610). For example, small cell device 230 may receive information identifying the set of neighboring base stations 220 (e.g., base stations within a particular proximity to small cell device 230). In some implementations, small cell device 230 may determine the set of neighboring base stations 220 based on receiving information from one or more devices associated with network 260 (e.g., one or more LTE core network devices).

Additionally, or alternatively, small cell device 230 may receive information from interference information device 250, base station 220, a location server (e.g., a device for monitoring locations of base stations 220 and providing information associated with the locations of base stations 220), or the like, identifying the set of neighboring base stations 220. For example, small cell device 230 may provide GPS location information to interference information device 250, and may receive the information identifying the set of neighboring base stations 220 based on providing the GPS location information. Additionally, or alternatively, small cell device 230 may receive transmissions from one or more base stations 220, and may determine the set of neighboring base stations 220 based on receiving the transmissions from one or more base stations 220.

As further shown in FIG. 6, process 600 may include subscribing to a set of interference information feeds associated with the set of neighboring base stations (block 620). For example, small cell device 230 may subscribe to the set of interference information feeds associated with the set of neighboring base stations 220. An interference information feed may refer to an information feed providing interference information regarding transmissions from base station 220, such as a rich site summary (RSS) feed, a Twitter feed, an Atom syndication feed, or the like. The interference information may include eMBMS transmission schedule information, service area information, transmission frequency information, eMBMS sub-frame allocation pattern information, or the like, provided to interference information device 250 by an LTE core network element, a broadcast video provisioning server (BVPS), a broadcast multicast service center (BMSC), base station 220, or the like.

In some implementations, small cell device 230 may subscribe to multiple interference information feeds associated with multiple base stations 220. For example, small cell device 230 may subscribe to a first particular interference information feed associated with first base station 220 and a second particular interference information feed associated with second base station 220. Additionally, or alternatively, small cell device 230 may subscribe to a set of interference information feeds associated with geographic areas. Additionally, or alternatively, small cell device 230 may subscribe to a particular interference information feed associated with small cell device 230. For example, small cell device 230 may request that interference information device 250 establish a particular interference information feed providing interference information regarding the set of neighboring base stations 220, and may subscribe to the particular interference information feed.

As further shown in FIG. 6, process 600 may include receiving interference information via the set of interference information feeds (block 630). For example, small cell device 230 may receive interference information via the set of interference information feeds. In some implementations, small cell device 230 may receive information regarding scheduling of transmissions, frequency information, phase information, base station sub-frame information, or the like, associated with the set of base stations 220. In some implementations, small cell device 230 may receive the interference information based on accessing interference information device 250 (e.g., via the set of interference information feeds). Additionally, or alternatively, small cell device 230 may receive the interference information based on interference information device 250 providing the interference information via the set of interference information feeds (e.g., via a push notification, a tweet, a ping, or the like).

In some implementations, small cell device 230 may receive particular interference information associated with identifying a set of base station sub-frames associated with a pre-allocated usage, a semi-statically reserved usage, or the like, such as an eMBMS usage, an MBMS usage, another multicast service usage, or the like. For example, small cell device 230 may receive interference information via an interference information feed that identifies a set of base station sub-frames (e.g., sub-frames providing eMBMS transmissions), and may determine that the set of base station sub-frames are to interfere with small cell device sub-frames being provided by small cell device 230.

As further shown in FIG. 6, process 600 may include selectively modifying a transmission based on the interference information (block 640). For example, small cell device 230 may selectively modify the transmission based on the interference information. In some implementations, small cell device 230 may modify the transmission by blanking a set of small cell device sub-frames corresponding to a set of base station sub-frames associated with providing eMBMS transmissions, as described herein in regard to FIG. 4. Additionally, or alternatively, small cell device 230 may alter a schedule of the transmission, a frequency of the transmission, a phase of the transmission, or the like, for a set of small cell device sub-frames corresponding to a set of base station sub-frames associated with providing eMBMS transmissions. In this way, small cell device 230 may avoid causing interference with eMBMS transmissions by subscribing to an interference information feed, and receiving interference information from the interference information feed that is utilized to selectively blank interfering small cell device sub-frames or selectively altering a frequency, a schedule, or the like, of a transmission by small cell device 230.

Although FIG. 6 shows example blocks of process 600, in some implementations, process 600 may include additional blocks, fewer blocks, different blocks, or differently arranged blocks than those depicted in FIG. 6. Additionally, or alternatively, two or more of the blocks of process 600 may be performed in parallel.

FIGS. 7A-7D are diagrams of an example implementation 700 relating to example process 600 shown in FIG. 6. FIGS. 7A-7D show an example of modifying a small cell device transmission based on information from an interference information feed to prevent interference.

As shown in FIG. 7A, assume that location server 705 provides base station location information to interference information device 250 (e.g., information identifying a set of locations for a set of base stations 220). As shown by reference number 710, interference information device 250 receives eMBMS service information (e.g., information regarding one or more eMBMS transmissions from the set of base stations 220) from a device associated with network 260 (e.g., an eMBMS core network device). Assume that interference information device 250 stores the base station location information and the eMBMS service information via a data structure.

Figure 7B:
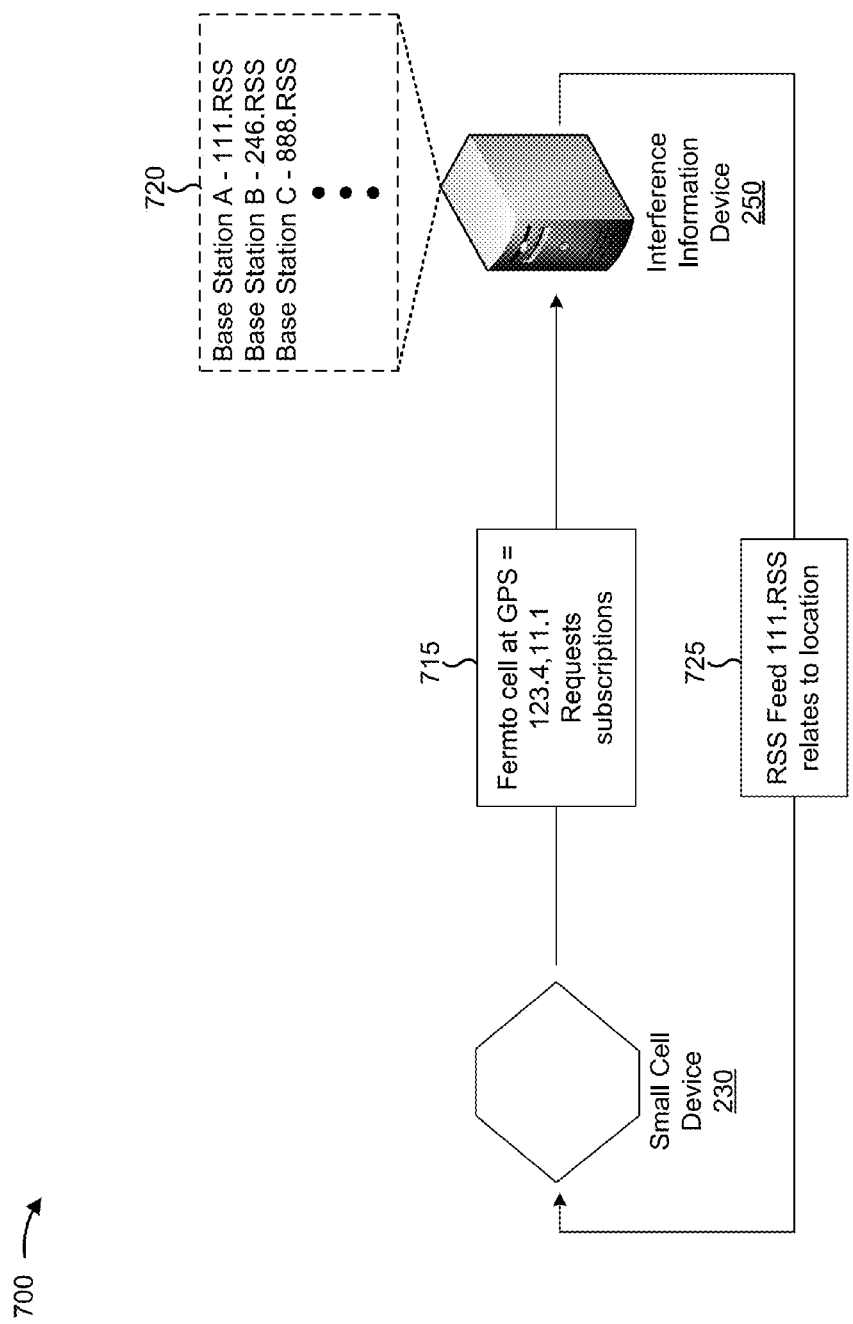

As shown in FIG. 7B, and by reference number 715, small cell device 230 provides GPS information identifying a particular location for small cell device 230 and requests a subscription to a set of interference information feeds associated with the particular location. As shown by reference number 720, interference information device 250 includes information identifying a set of RSS feeds associated with the set of base stations 220. Assume that interference information device 250 determines that, based on the particular location for small cell device 230, a particular base station 220 (e.g., "Base Station A") neighbors small cell device 230 (e.g., "Base Station A" may be subject to interference as a result of transmissions from small cell device 230). As shown by reference number 725, interference information device 250 provides information indicating that a particular RSS feed, of the set of RSS feeds, provides information regarding the particular base station 220 that neighbors small cell device 230. Assume that small cell device 230 subscribes to the particular RSS feed.

Figure 7C:
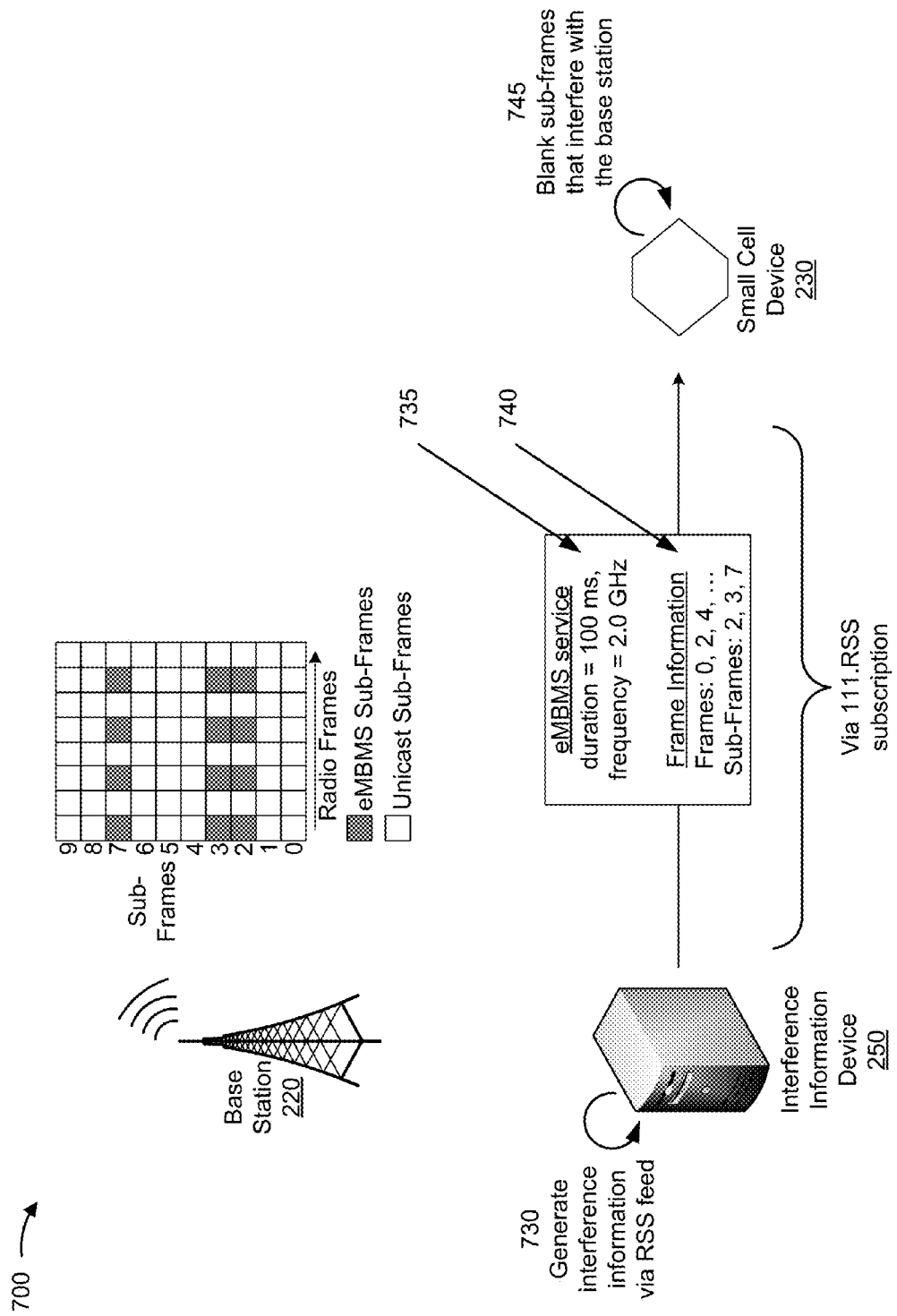

As shown in FIG. 7C, and by reference number 730, interference information device 250 generates interference information (e.g., based on the transmission information from base station 220, the eMBMS service information from the device associated with network 260, or the like) via the particular RSS feed. As shown by reference number 735, the interference information includes duration information and frequency information associated with a transmission from base station 220. As shown by reference number 740, the interference information includes frame information identifying particular base station sub-frames of the transmission from base station 220 associated with providing eMBMS transmissions. As shown by reference number 745, small cell device 230 blanks small cell device sub-frames that may interfere with the base station sub-frames providing eMBMS transmissions based on receiving the interference information.

Figure 7D:
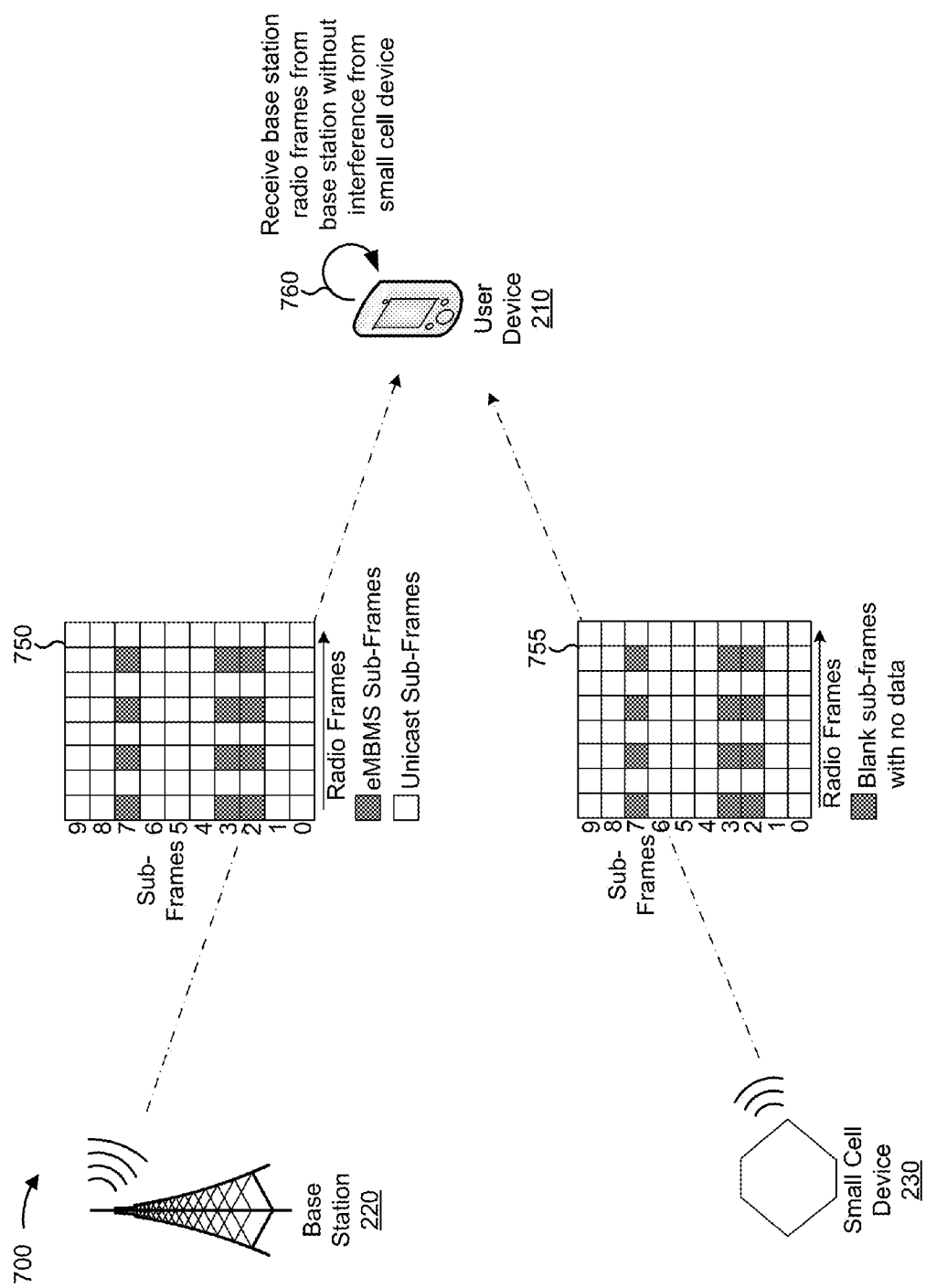

As shown in FIG. 7D, and by reference number 750, base station 220 provides a set of base station radio frames to user device 210 (e.g., the set of base station radio frames that were identified via the interference information feed and include a particular set of eMBMS sub-frames). As shown by reference number 755, small cell device 230 provides a set of small cell device radio frames to user device 210 (e.g., a particular set of small cell device radio frames generated with a particular set of blanked small cell device sub-frames that correspond to the particular set of eMBMS sub-frames). As shown by reference number 760, based on small cell device 230 blanking the particular set of small cell device sub-frames corresponding to the particular set of eMBMS sub-frames, user device 210 receives the set of base station radio frames without experiencing interference caused by the set of small cell device radio frames.

As indicated above, FIGS. 7A-7D are provided merely as an example. Other examples are possible and may differ from what was described with regard to FIGS. 7A-7D.

In this way, a small cell device may avoid interference with a base station by detecting base station sub-frames and/or receiving information identifying base station sub-frames that are associated with providing eMBMS transmissions, and blanking small cell device sub-frames that correspond to the identified base station sub-frames, altering a frequency, a schedule, etc. of a transmission by small cell device 230, or the like.

Although FIG. 4 and FIG. 6 describe example processes in connection with avoiding interference with an eMBMS transmission, FIG. 4 and FIG. 6 may also describe processes for avoiding interference with another type of transmission, such as an MBMS transmission, a unicast transmission, a broadcast transmission, a multicast transmission, or the like.

The foregoing disclosure provides illustration and description, but is not intended to be exhaustive or to limit the implementations to the precise form disclosed. Modifications and variations are possible in light of the above disclosure or may be acquired from practice of the implementations.

As used herein, the term component is intended to be broadly construed as hardware, firmware, or a combination of hardware and software.

Some implementations are described herein in connection with thresholds. As used herein, satisfying a threshold may refer to a value being greater than the threshold, more than the threshold, higher than the threshold, greater than or equal to the threshold, less than the threshold, fewer than the threshold, lower than the threshold, less than or equal to the threshold, equal to the threshold, etc.

To the extent the aforementioned embodiments collect, store, or employ personal information provided by individuals, it should be understood that such information shall be used in accordance with all applicable laws concerning protection of personal information. Additionally, the collection, storage, and use of such information may be subject to consent of the individual to such activity, for example, through well known "opt-in" or "opt-out" processes as may be appropriate for the situation and type of information. Storage and use of personal information may be in an appropriately secure manner reflective of the type of information, for example, through various encryption and anonymization techniques for particularly sensitive information.

It will be apparent that systems and/or methods, described herein, may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware can be designed to implement the systems and/or methods based on the description herein.

Even though particular combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Furthermore, as used herein, the term "set" is intended to include one or more items, and may be used interchangeably with "one or more." Where only one item is intended, the term "one" or similar language is used. Also, as used herein, the terms "has," "have," "having," or the like are intended to be open-ended terms. Further, the phrase "based on" is intended to mean "based, at least in part, on" unless explicitly stated otherwise.

What is claimed is:

1. A method, comprising:
    subscribing, by a device, to a web feed associated with providing information identifying a transmission from a base station
    receiving, by the device and via the web feed, the information identifying the transmission from the base station,
        the transmission including one or more sub-frames associated with providing a multimedia broadcast multicast service transmission;
    determining, by the device, that the one or more sub-frames are associated with providing the multimedia broadcast multicast service transmission;
    determining, by the device, that one or more other sub-frames, to be transmitted, may interfere with the one or more sub-frames associated with providing the multimedia broadcast multicast service transmission; and
    providing, by the device, another transmission without information being provided via the one or more other sub-frames based on determining that the one or more other sub-frames may interfere with the one or more sub-frames associated with providing the multimedia broadcast multicast service transmission.

2. The method of claim 1, where receiving the information identifying the transmission from the base station further comprises:
    monitoring one or more resources associated with a set of transmissions from the base station; and
    receiving the information identifying the transmission from the base station based on monitoring the one or more resources associated with the set of transmissions from the base station.

3. The method of claim 1, further comprising
    blanking the one or more other sub-frames that may interfere with the one or more sub-frames associated with providing the multimedia broadcast multicast service transmission; and
    where providing the other transmission without information being provided via the one or more other sub-frames further comprises:

providing the other transmission based on blanking the one or more other sub-frames.

4. The method of claim 1, where receiving the information identifying the transmission from the base station further comprises at least one of:
receiving the information identifying the transmission based on detecting the transmission from the base station; or
receiving the information identifying the transmission from an information feed describing the transmission from the base station.

5. The method of claim 1, further comprising:
determining that the one or more other sub-frames are associated with providing a unicast transmission; and
where determining that the one or more other sub-frames may interfere with the one or more sub-frames associated with providing the multimedia broadcast multicast service transmission, further comprises:
determining that the one or more other sub-frames may interfere with the one or more sub-frames associated with providing the multimedia broadcast multicast service transmission based on determining that the one or more other sub-frames are associated with the unicast transmission.

6. The method of claim 1, where the web feed includes a social networking feed or an Atom syndication feed.

7. A system comprising:
a memory; and
one or more processors to:
identify a set of neighboring base stations,
the set of neighboring base stations providing multicast service transmissions via a first set of sub-frames associated with a first set of radio frames;
subscribe to a set of web feeds associated with providing interference information;
receive the interference information via the set of web feeds,
the interference information including information regarding the first set of sub-frames; and
selectively modify a particular transmission based on the interference information,
the particular transmission including a second set of sub-frames, of a second set of radio frames, being determined to interfere with the first set of sub-frames, of the first set of radio frames, providing multicast service transmissions from the set of neighboring base stations.

8. The system of claim 7,
where the one or more processors are further to:
provide location information to a network device associated with managing the set of neighboring base stations,
the location information identifying a set of locations for the set of neighboring base stations,
the set of neighboring base stations being located within a particular proximity to a small cell device, and
the small cell device being associated with providing the particular transmission; and
where, when identifying the set of neighboring base stations, the one or more processors are to:
identify the set of neighboring base stations based on providing the location information to the network device.

9. The system of claim 7, where the set of web feeds include a set of rich site summary (RSS) feeds associated with providing the interference information.

10. The system of claim 7, where, when selectively modifying the particular transmission based on the interference information, the one or more processors are to:
blank one or more sub-frames, of the second set of sub-frames, associated with the particular transmission based on the interference information,
the one or more sub-frames having being determined to interfere with the multicast service transmissions.

11. The system of claim 7, where, when selectively modifying the particular transmission based on the interference information, the one or more processors are to:
alter a transmission schedule associated with the particular transmission based on the interference information.

12. The system of claim 7,
where the one or more processors are further to:
determine a set of resources associated with the multicast service transmissions based on the interference information, and
where, when selectively modifying the particular transmission based on the interference information, the one or more processors are to:
selectively modify the particular transmission to avoid utilizing one or more resources corresponding to the set of resources associated with the multicast service transmissions.

13. The system of claim 7,
where the one or more processors are further to:
receive information identifying a plurality of interference information feeds,
the plurality of interference information feeds including the set of web feeds; and
select the set of web feeds based on the information identifying the plurality of interference information feeds and location information identifying locations for the set of neighboring base stations, and
where, when subscribing to the set of web feeds, the one or more processors are to:
subscribe to the set of web feeds based on selecting the set of web feeds.

14. A computer-readable medium storing instructions, the instructions comprising:
one or more instructions that, when executed by one or more processors, cause the one or more processors to:
identify a set of neighboring base stations,
the set of neighboring base stations providing multicast service transmissions via a first set of sub-frames associated with a first set of radio frames;
subscribe to a set of web feeds associated with providing interference information;
receive the interference information via the set of web feeds,
the interference information including information regarding the first set of sub-frames; and
selectively modify a particular transmission based on the interference information,
the particular transmission including a second set of sub-frames, of a second set of radio frames, being determined to interfere with the first set of sub-frames, of the first set of radio frames, providing multicast service transmissions from the set of neighboring base stations.

15. The computer-readable medium of claim 14, where the one or more instructions, when executed by the one or more processors, further cause the one or more processors to:

provide location information to a network device associated with managing the set of neighboring base stations, the location information identifying a set of locations for the set of neighboring base stations, the set of neighboring base stations being located within a particular proximity to a small cell device, and the small cell device being associated with providing the particular transmission; and where the one or more instructions, that cause the one or more processors to identify the set of neighboring base stations, further cause the one or more processors to:

identify the set of neighboring base stations based on providing the location information to the network device.

16. The computer-readable medium of claim 14, where the set of web feeds include a set of rich site summary (RSS) feeds associated with providing the interference information.

17. The computer-readable medium of claim 14, where the one or more instructions, that cause the one or more processors to selectively modify the particular transmission based on the interference information, further cause the one or more processors to:

blank one or more sub-frames, of the second set of sub-frames, associated with the particular transmission based on the interference information, the one or more sub-frames having being determined to interfere with the multicast service transmissions.

18. The computer-readable medium of claim 14, where the one or more instructions, that cause the one or more processors to selectively modify the particular transmission based on the interference information, further cause the one or more processors to:

alter a transmission schedule associated with the particular transmission based on the interference information.

19. The computer-readable medium of claim 14, where the one or more instructions, that cause the one or more processors to selectively modify the particular transmission based on the interference information, further cause the one or more processors to:

determine a set of resources associated with the multicast service transmissions based on the interference information; and selectively modify the particular transmission to avoid utilizing one or more resources corresponding to the set of resources associated with the multicast service transmissions.

20. The computer-readable medium of claim 14, where the one or more instructions, that cause the one or more processors to subscribe to the set of web feeds, further cause the one or more processors to:

receive information identifying a plurality of interference information feeds, the plurality of interference information feeds including the set of web feeds;

select the set of web feeds based on the information identifying the plurality of interference information feeds and location information identifying locations for the set of neighboring base stations; and subscribe to the set of web feeds based on selecting the set of web feeds.

* * * * *